(12) United States Patent
Golding

(10) Patent No.: US 10,913,290 B2
(45) Date of Patent: Feb. 9, 2021

(54) PORTABLE PRINTER APPARATUS

(71) Applicant: Rohan Golding, Brooklyn, NY (US)

(72) Inventor: Rohan Golding, Brooklyn, NY (US)

( * ) Notice: Subject to any disclaimer, the term of this patent is extended or adjusted under 35 U.S.C. 154(b) by 0 days.

(21) Appl. No.: 15/638,326

(22) Filed: Jun. 29, 2017

(65) Prior Publication Data
US 2020/0391520 A1    Dec. 17, 2020

(51) Int. Cl.
*B41J 3/36* (2006.01)
*G06F 3/12* (2006.01)
*H04M 1/725* (2006.01)

(52) U.S. Cl.
CPC .............. *B41J 3/36* (2013.01); *G06F 3/1209* (2013.01); *G06F 3/1229* (2013.01); *G06F 3/1236* (2013.01); *G06F 3/1268* (2013.01); *H04M 1/7253* (2013.01); *H04M 1/7255* (2013.01); *G06F 3/128* (2013.01); *G06F 3/1292* (2013.01)

(58) Field of Classification Search
CPC ...... B41J 3/36; H04M 1/7253; H04M 1/7255; G06F 3/1236; G06F 3/1209; G06F 3/1229; G06F 3/1268; G06F 3/128; G06F 3/1292
See application file for complete search history.

(56) References Cited

U.S. PATENT DOCUMENTS

2005/0037709 A1*  2/2005  Hwang .............. H04N 1/00127
455/66.1

OTHER PUBLICATIONS

IP.com search (Year: 2020).*
Wikipedia Article Headset (audio), retrieved on [Oct. 20, 2020], Sections: Telephone and Mobile phone (Year: 2020).*

* cited by examiner

*Primary Examiner* — Lisa Solomon
(74) *Attorney, Agent, or Firm* — Bruce A. Lev

(57) ABSTRACT

A portable printer apparatus is a specially designed enhancement for portable laptop computers, tablets, and smart phones that incorporates a portable printer apparatus with the convenience of a portable electronic unit. The portable printer apparatus is battery powered and able to connect to a portable electronic device and print any on-line or off-line documents that the portable electronic device is able to receive wirelessly or store in memory, from any location regardless of power availability.

18 Claims, 3 Drawing Sheets

PORTABLE PRINTER APPARATUS

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR 1.71(d).

BACKGROUND OF THE INVENTION

The following includes information that may be useful in understanding the present invention(s). It is not an admission that any of the information provided herein is prior art, or material, to the presently described or claimed inventions, or that any publication or document that is specifically or implicitly referenced is prior art.

1. Field of the Invention

The present invention relates generally to the field of printers and more specifically relates to a portable printer apparatus.

2. Description of the Related Art

In the later portion of the twentieth century the world began moving into the computer age. Today, the dependence on this technology has reached such unprecedented levels in the corporate world and the government operations of every nation so that militaries, national economies, and just about everything else that uses information technology is interdependent upon computers.

Additionally, the prevalence of computers in the workplace has reached a point that most firms require applicants to have more than just a small amount of computer experience. In fact, over 66% of the U.S. workforce now uses a computer on the job daily, from receptionists answering computerized telephone systems and cashiers ringing up sales in Wal-Mart on registers that are tied into vast electronic databases to professionals creating detailed spreadsheets and many other fields relying on the Internet as a daily routine. Computer technology has today evolved to encompass wireless communication, with ubiquitous mobile devices such as digital music players, electronic readers, smart phones, and now sleek, portable tablet computers such as Apple's iPad providing access to the world at one's fingertips.

Compact and lightweight, tablet computers have, in just two years, evolved from being an expensive luxury to an everyday business and pleasure tool. Allowing business travelers to do their work wherever their jobs take them, tablets have become invaluable tools for staying abreast of important correspondence and completing professional projects and presentations. In addition, these portable devices allow consumers to work from virtually anywhere, whether at the kitchen table, lying upon a bed, sitting in an airplane seat, or lounging on a park bench.

However, while a tablet computer (and many smart phones, as well) can complete virtually any task that a stationary PC can do, there is one it cannot do: allow a user to print a document while on the go. In order to print from such devices, one must connect it to an external printer via a USB port or wireless networking. Yet, these options may not be available to users who are working, for instance, outdoors, where there is no WiFi available, or in a location not equipped with a printer. This can prove problematic for the aforementioned smart phones, which are not equipped to print at all. Should one use the phone to access important email that should be printed, he or she has no choice but to hope that wireless service remains intact to allow referral back to the correspondence. An innovation that would make this valuable function portable would be welcomed.

Various attempts have been made to solve the above-mentioned problems such as those found in U.S. Pat. No. 8,057,032 to Paul Lapstun et al; U.S. Pat. No. 7,661,813 to Kia Silverbrook et al; and U.S. Pat. No. 7,701,602 to Paul Michael Burke et al. This art is representative of portable printer assemblies. None of the above inventions and patents, taken either singly or in combination, is seen to describe the invention as claimed.

Ideally, a printers should provide convenience and portability, and yet, would operate reliably and be manufactured at a modest expense. Thus, a need exists for a reliable portable printer apparatus to avoid the above-mentioned problems.

BRIEF SUMMARY OF THE INVENTION

In view of the foregoing disadvantages inherent in the known printer art, the present invention provides a novel portable printer apparatus. The general purpose of the present invention, which will be described subsequently in greater detail, is to provide convenience and portability of printing.

The portable printer apparatus for use with mobile communication devices may comprise a main body including an interior volume, a printer member located within the main body and adapted to print images on paper passing through the interior volume, a receiver member located within the main body adapted to receive electronic signals from one of the mobile communication devices, and to send electronic signals to the printer to thereby instruct the printer member to print the images on the paper passing through the interior volume. A power source is attached to the main body and is adapted to provide power to the printer member and the receiver member.

The power source is formed as a rechargeable battery member. A plurality of button members attached to the main body and is adapted to allow a user to control the power source and the printer member. At least one collapsible prong is attached to the main body that is adapted to guide the paper into, through, and out of the interior volume.

A light emitting diode screen member is attach to the outer surface of the main body and is adapted to display images and verbiage being electronically sent to the receiver member. The portable printer apparatus is formed having dimensions that are substantially 2 inches in height, 2 inches in length, and 8½ inches in width. A USB port is adapted to receive an attachment member of a USB wire therein and adapted to receive electronic signals therethrough to control the printer member.

The combination of a mobile communication device and a portable printer apparatus may comprise a mobile communication device including, a transmitter, a receiver, and computer circuitry that include software encoded thereon that is adapted to electronically connect with and control a portable printer apparatus. The portable printer apparatus for use with mobile communication devices, may comprise a main body including an interior volume, a printer member located within the main body that is adapted to print images on paper passing through the interior volume, a receiver member located within the main body that is adapted to receive electronic signals from the mobile communication device and is adapted to send the electronic signals to the printer to thereby instruct the printer member to print the images on the paper passing through the interior volume.

A power source is attached to the main body and is adapted to provide power to the printer member and the receiver member. The power source may be formed as a rechargeable battery member. A plurality of button members may be attached to the main body and are adapted to allow a user to control the power source and the printer member. At least one collapsible prong is attached to the main body and is adapted to guide the paper into, through, and out of the interior volume. A plurality of collapsible prongs are attached to the main body and adapted to guide the paper passing into, through, and out of the interior volume.

A light emitting diode screen member attach to the outer surface of the main body is adapted to display images and verbiage being electronically sent to the receiver member. The portable printer apparatus is formed having dimensions that are substantially 2 inches in height, 2 inches in length, and 8½ inches in width. A usb port is adapted to receive an attachment member of a usb wire therein and is adapted to receive electronic signals therethrough to control the printer member.

The mobile communication device further includes a combination ear piece and mouth piece member adapted to wirelessly connect with the transmitter and receiver. The combination ear piece and mouth piece member is wirelessly connected with the transmitter and the receiver via BLUETOOTH technology. The combination is adapted such that a person can speak into the combination ear piece and mouth piece member and the verbiage can be printed on paper passing through the interior volume of the main body of the portable printer apparatus. The portable printer apparatus further includes at least one speaker member attached to the main body and is adapted to project sounds sent via the mobile communication device.

The present invention holds significant improvements and serves as a portable printer apparatus. For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and method(s) of use for the present invention, portable printer apparatus, constructed and operative according to the teachings of the present invention.

The various embodiments of the present invention will hereinafter be described in conjunction with the appended drawings, wherein like designations denote like elements.

DETAILED DESCRIPTION

As discussed above, embodiments of the present invention relate to a printer and more particularly to a portable printer apparatus as used to improve the convenience and portability of printing.

Generally speaking, a portable printer apparatus is a specially designed enhancement for portable laptop computers, tablets, and smart phones that incorporates a portable printer apparatus with the convenience of a portable electronic unit. The portable printer apparatus is battery powered and able to connect to a portable electronic device and print any on-line or off-line documents that the portable electronic device is able to receive wirelessly or store in memory, from any location regardless of power availability.

Figure 1:
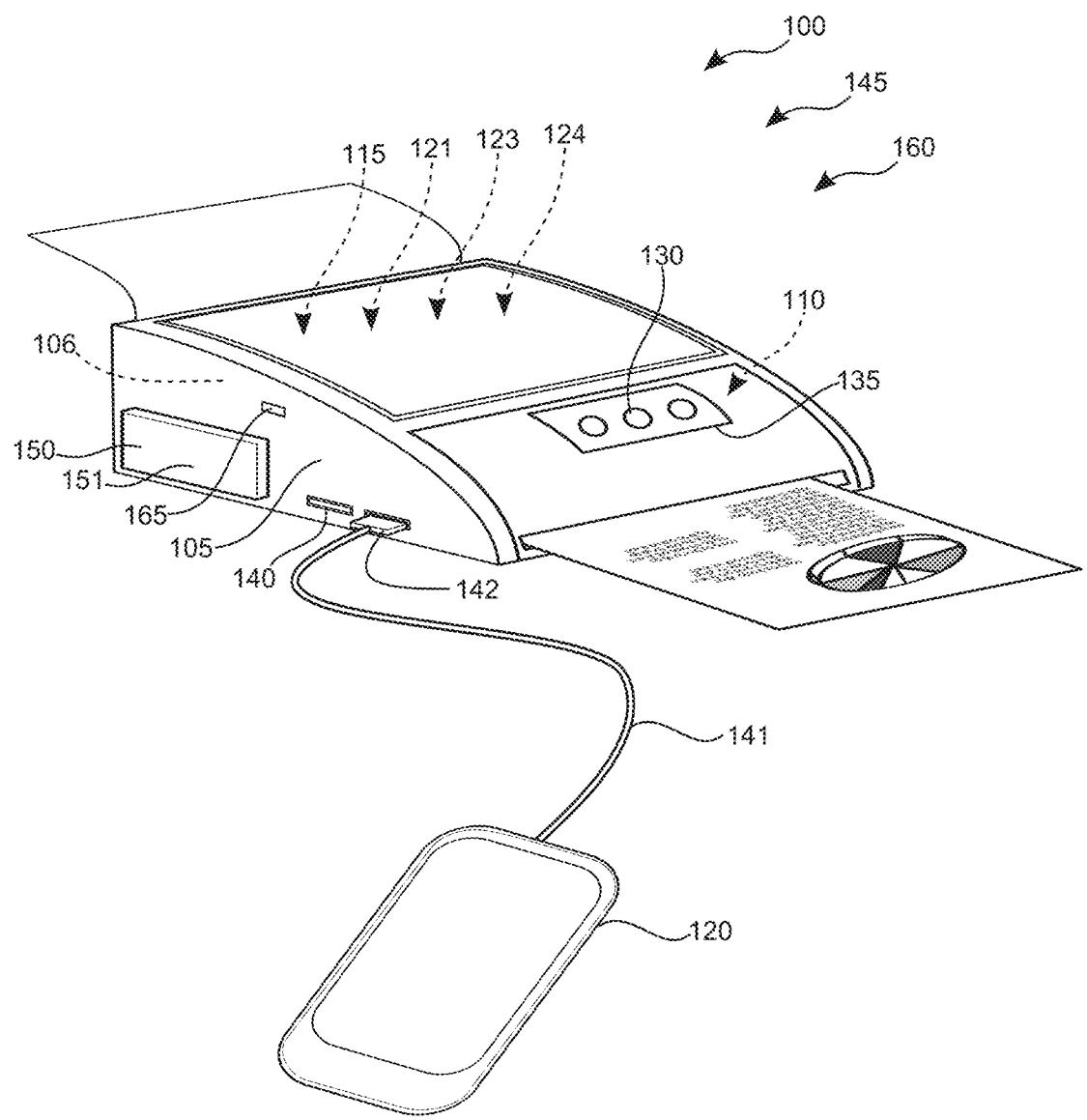
FIG. 1 shows a perspective view illustrating a portable printer apparatus according to an embodiment of the present invention.

In greater detail now, referring to the drawings by numerals of reference there is shown in FIG. 1, a perspective view illustrating a portable printer apparatus according to an embodiment of the present invention.

Portable printer apparatus 100 for use with mobile communication device 120 may comprise main body 105 including interior volume 106, printer member 110 located within main body 105 and adapted to print images on paper passing through interior volume 106, receiver member 115 located within main body 105 adapted to receive electronic signals from one of mobile communication device 120, and to send electronic signals to printer member 110 to thereby instruct printer member 110 to print the images on the paper passing through interior volume 106. Power source 150 is attached to main body 105 and is adapted to provide power to printer member 110 and receiver member 115.

Power source 150 is formed as rechargeable battery member 151. A plurality of button member 130 attached to main body 105 and is adapted to allow a user to control power source 150 and printer member 110. At least one collapsible prong 107 is attached to main body 105 that is adapted to guide the paper into, through, and out of interior volume 106.

Light emitting diode screen member 135 is attach to the outer surface of main body 105 and is adapted to display images and verbiage being electronically sent to receiver member 115. Portable printer apparatus 100 is formed having dimensions that are substantially 2 inches in height, 2 inches in length, and 8½ inches in width. USB port 140 is adapted to receive attachment member 142 of USB wire 141 therein and adapted to receive electronic signals therethrough to control printer member 110.

Figure 2:
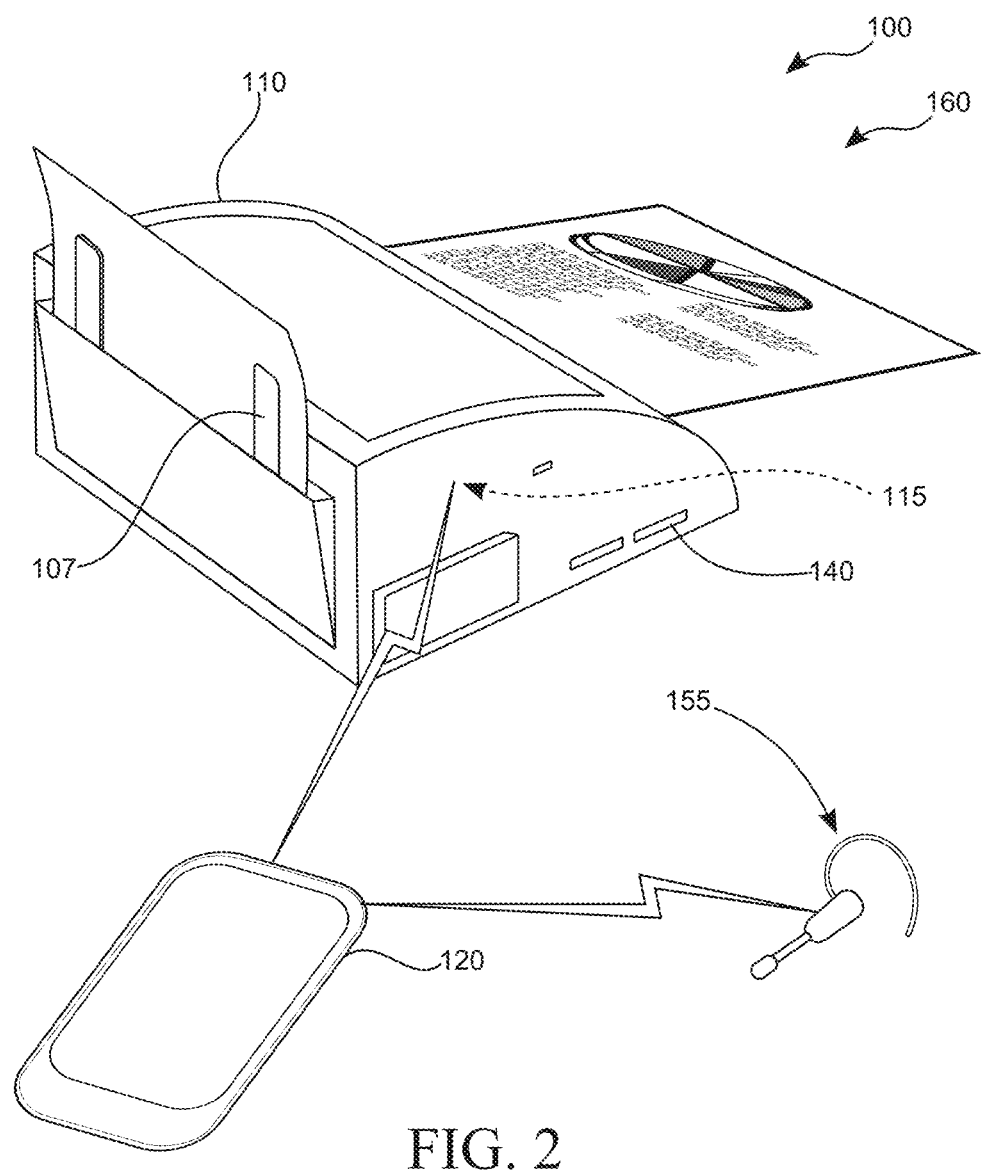
FIG. 2 is a perspective view illustrating a portable printer apparatus according to an embodiment of the present invention of FIG. 1.

Referring now to FIG. 2, is a perspective view illustrating portable printer apparatus 100 according to an embodiment of the present invention of FIG. 1.

Combination 145 of mobile communication device 120 and portable printer apparatus 100 may comprise mobile communication device 120 including, transmitter 121, receiver 122, and computer circuitry 123 that includes software 124 encoded thereon that is adapted to electronically connect with and control portable printer apparatus 100. Portable printer apparatus 100 for use with mobile communication device(s) 120, may comprise main body 105 including interior volume 106, printer member 110 located within main body 105 that is adapted to print images on paper passing through interior volume 106, receiver member 115 located within main body 105 that is adapted to receive electronic signals from mobile communication device(s) 120 and is adapted to send the electronic signals to printer member 110 to thereby instruct printer member 110 to print the images on the paper passing through interior volume 106.

Power source 150 is attached to main body 105 and is adapted to provide power to printer member 110 and receiver member 122. Power source 150 may be formed as rechargeable battery member 151. A plurality of button member(s) 130 may be attached to main body 105 and are adapted to allow a user to control power source 150 and printer member 110. At least one collapsible prong 107 is attached to main body 105 and is adapted to guide the paper into, through, and out of interior volume 106. A plurality of collapsible prong(s) 107 are attached to main body 105 and adapted to guide the paper passing into, through, and out of interior volume 106.

Figure 3:
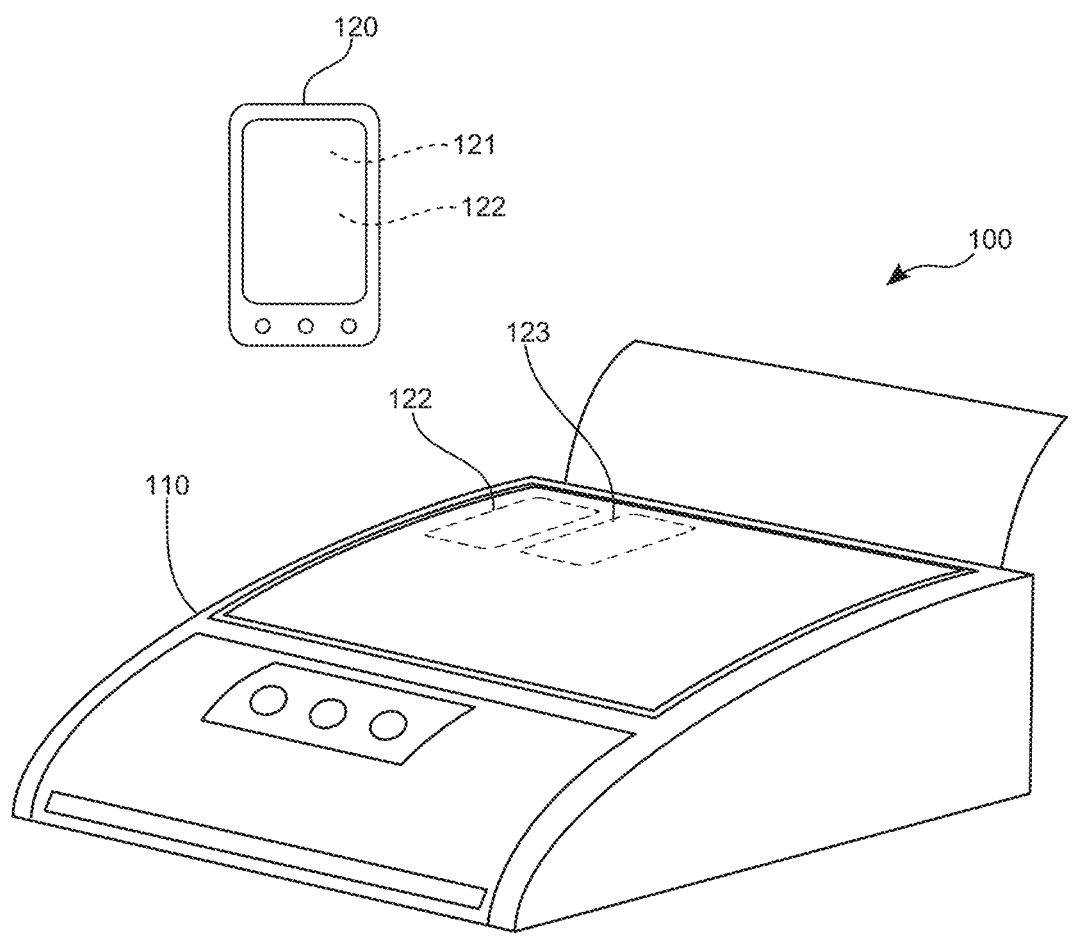
FIG. 3 is a perspective view illustrating portable printer apparatus according to an embodiment of the present invention of FIG. 1.

Referring now to FIG. 3, is a perspective view illustrating portable printer apparatus 100 according to an embodiment of the present invention of FIG. 1.

Light emitting diode screen member 135 attached to the outer surface of main body 105 is adapted to display images and verbiage being electronically sent to receiver member 115. Portable printer apparatus 100 is formed having dimensions that are substantially 2 inches in height, 2 inches in length, and 8½ inches in width. USB port 140 is adapted to receive attachment member 142 of USB wire 141 therein and is adapted to receive electronic signals therethrough to control printer member 110.

Mobile communication device(s) 120 further includes combination ear piece and mouth piece member 155 adapted to wirelessly connect with transmitter 121 and receiver member 122. Combination ear piece and mouth piece member 155 is wirelessly connected with transmitter 121 and receiver member 122 via bluetooth technology 160. Combination 145 is adapted such that a person can speak into combination ear piece and mouth piece member 155 and the verbiage can be printed on paper passing through interior volume 106 of main body 105 of portable printer apparatus 100. Portable printer apparatus 100 further includes at least one speaker member 165 attached to main body 105 and is adapted to project sounds sent via mobile communication device(s) 120.

Portable printer apparatus 100 may be manufactured and provided for sale in a wide variety of sizes and shapes for a wide assortment of applications. Upon reading this specification, it should be appreciated that, under appropriate circumstances, considering such issues as design preference, user preferences, marketing preferences, cost, structural requirements, available materials, technological advances, etc., other kit contents or arrangements such as, for example, including more or less components, customized parts, different color combinations, parts may be sold separately, etc., may be sufficient.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is:

1. A portable printer apparatus for use with mobile communication devices, comprising:
   a main body including:
      an interior volume;
   a printer member;
      wherein said printer member is located within said main body and is adapted to print images on paper passing through said interior volume;
   a receiver member;
      wherein said receiver member is located within said main body and is adapted to receive electronic signals from one of said mobile communication devices; and
      wherein said receiver member is adapted to send said electronic signals to said printer to thereby instruct said printer member to print said images on said paper passing through said interior volume;
   a power source;
      wherein said power source is attached to said main body and is adapted to provide power to said printer member and said receiver member; and
   a plurality of button members:
      wherein said plurality of button members are attached to said main body and are adapted to allow a user to control said power source and said printer member.

2. The portable printer apparatus of claim 1, wherein said power source is formed as a rechargeable battery member.

3. A portable printer apparatus for use with mobile communication devices, comprising:
   a main body including:
      an interior volume;
   a printer member;
      wherein said printer member is located within said main body and is adapted to print images on paper passing through said interior volume;
   a receiver member;
      wherein said receiver member is located within said main body and is adapted to receive electronic signals from one of said mobile communication devices; and
      wherein said receiver member is adapted to send said electronic signals to said printer to thereby instruct said printer member to print said images on said paper passing through said interior volume;
   a power source;
      wherein said power source is attached to said main body and is adapted to provide power to said printer member and said receiver member; and
   at least one collapsible prong:
      Wherein said at least one collapsible prong is attached to said main body adapted to guide said paper passing into, through, and out of said interior volume.

4. The portable printer apparatus of claim 1, further comprising an light emitting diode screen member attach to an outer surface of said main body and adapted to display images and verbiage being electronically sent to said receiver member.

5. The portable printer apparatus of claim 1, wherein said portable printer apparatus is formed having dimensions that are substantially 2 inches in height, 2 inches in length, and 8½ inches in width.

6. The portable printer apparatus of claim 1, further comprising a USB port adapted to receive an attachment member of a USB wire therein and adapted to receive electronic signals therethrough to control said printer member.

7. A combination of a mobile communication device and a portable printer apparatus comprising:
- a mobile communication device including;
  - a transmitter;
  - a receiver;
  - computer circuitry;
    - wherein said computer circuitry includes software encoded thereon adapted to electronically connect with and control a portable printer apparatus;
- a portable printer apparatus for use with mobile communication devices, comprising:
  - a main body including:
    - an interior volume;
  - a printer member;
    - wherein said printer member is located within said main body and is adapted to print images on paper passing through said interior volume;
  - a receiver member;
    - wherein said receiver member is located within said main body and is adapted to receive electronic signals from said mobile communication device; and
    - wherein said receiver member is adapted to send said electronic signals to said printer to thereby instruct said printer member to print said images on said paper passing through said interior volume;
  - a power source;
    - wherein said power source is attached to said main body and is adapted to provide power to said printer member and said receiver member; and
  - a USB port:
    - wherein said USB port is adapted to receive an attachment member of a USB wire therein and adapted to receive electronic signals therethrough to control said printer member.

8. The combination of claim 7, wherein said power source is formed as a rechargeable battery member.

9. The combination of claim 7, further comprising a plurality of button members attached to said main body and are adapted to allow a user to control said power source and said printer member.

10. The combination of claim 7, further comprising at least one collapsible prong attached to said main body adapted to guide said paper passing into, through, and out of said interior volume.

11. The combination of claim 10, comprising a plurality of collapsible prongs attached to said main body adapted to guide said paper passing into, through, and out of said interior volume.

12. The combination of claim 7, further comprising an light emitting diode screen member attach to an outer surface of said main body and adapted to display images and verbiage being electronically sent to said receiver member.

13. The combination of claim 7, wherein said portable printer apparatus is formed having dimensions that are substantially 2 inches in height, 2 inches in length, and 8½ inches in width.

14. The combination of claim 7, wherein said mobile communication device further includes a combination ear piece and mouth piece member adapted to wirelessly connect with said transmitter and said receiver.

15. The combination of claim 14, wherein said combination ear piece and mouth piece member is wirelessly connected with said transmitter and said receiver via BLUETOOTH technology.

16. The combination of claim 14, wherein said combination is adapted such that a person can speak into said combination ear piece and mouth piece member and said verbiage can be printed on said paper passing through said interior volume of said main body of said portable printer apparatus.

17. The combination of claim 7, wherein said portable printer apparatus further includes at least one speaker member attached to said main body and adapted to project sounds sent via said mobile communication device.

18. The portable printer apparatus of claim 3, comprising a plurality of collapsible prongs attached to said main body adapted to guide said paper passing into, through, and out of said interior volume.

* * * * *